No. 754,021. PATENTED MAR. 8, 1904.
D. H. STAPLES.
FLUID PRESSURE COUPLING FOR AIR BRAKE VALVES.
APPLICATION FILED OCT. 5, 1903.
NO MODEL.
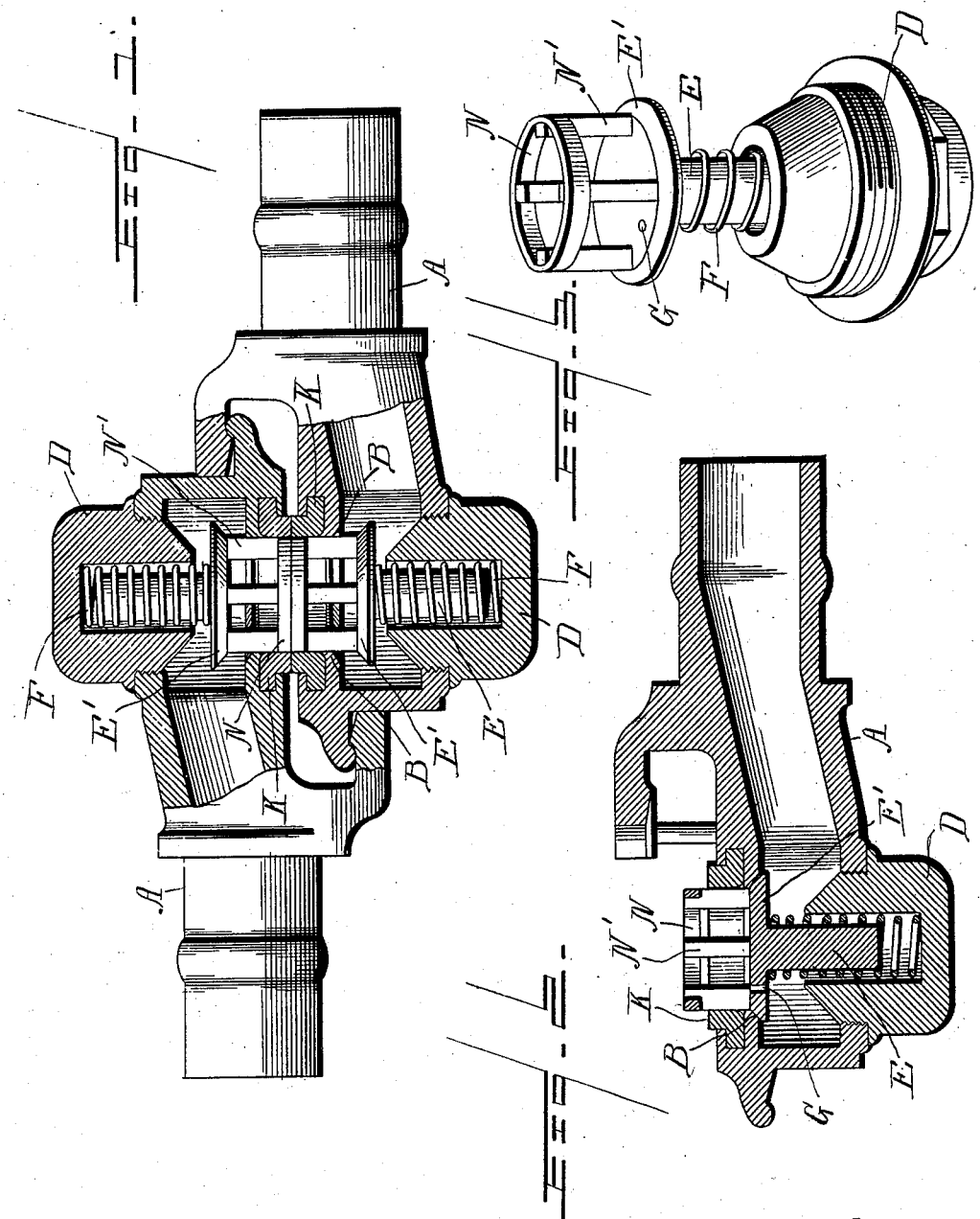
WITNESSES:
Wm F. Doyle.
A. L. Haug.
INVENTOR
David Hackett Staples,
BY
Franklin H. Hough
Attorney No. 754,021. Patented March 8, 1904.

UNITED STATES PATENT OFFICE.

DAVID H. STAPLES, OF SKOWHEGAN, MAINE.

FLUID-PRESSURE COUPLING FOR AIR-BRAKE VALVES.

SPECIFICATION forming part of Letters Patent No. 754,021, dated March 8, 1904.

Application filed October 5, 1903. Serial No. 175,856. (No model.)

*To all whom it may concern:*

Be it known that I, DAVID HACKETT STAPLES, a citizen of the United States, residing at Skowhegan, in the county of Somerset and State of Maine, have invented certain new and useful Improvements in Fluid-Pressure Couplings for Air-Brake Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fluid-pressure coupling for air-brake pipes and comprises a means whereby the coupler may be used effectually in connection with other forms of couplers having a standard gasket, whereby a tight joint is effected and the coupler-heads locked together, and in the provision of means for utilizing all of the available space within the chamber of the head for the reception of the air under pressure and in an unrestricted passage-way from one coupler-head to another when the valves are open.

More specifically, the invention comprises a coupler which is provided with a spring-pressed valve having an annular ring mounted upon extension-arms from the valve and adapted to fit snugly the space inside the bore of the valve-opening, said ring forming means for contact with the marginal edge of the gasket of other types of couplers, whereby when two couplers of different makes are connected an air-tight joint is effected.

Another advantage derived from the peculiar construction of valve with the extension-ring on the inner face thereof is to provide means for holding the valve unseated when two coupler-heads similarly equipped are being connected or disconnected, said valve being held unseated while the heads are slightly tilted.

The invention consists, further, in various details of construction, combinations, and arrangements of parts, which will be hereinafter fully described and then specifically defined in the appended claim.

My invention is illustrated in the accompanying drawings, in which—

Figure 1 is a central longitudinal section through a coupler embodying the features of my invention. Fig. 2 is a vertical sectional view through a coupler-head, showing the valve seated; and Fig. 3 is an enlarged detail perspective of one of the valves and the plugs holding the same.

Reference now being had to the details of the drawings by letter, A A designate coupler-heads embodying my invention, which are of similar construction, and each coupler is shown as provided with valve-seats B, formed in the partitions of the coupler-heads, and D designates a threaded plug fitted in a threaded aperture of the head and has a central bore adapted to receive the stem E of the valve E', and a spring F is mounted in each of said bores and bears against the bottom of the latter and the valve E' for the purpose of holding the valve normally seated. Mounted in apertures in the adjacent faces of the coupler-heads are the gaskets K, which are provided with flanges and seated in annular recesses, as shown, and N designates a metallic ring which is positioned at the ends of the extension-strips N', which are integral with the outer face of the valve E'. The diameter of said ring N is equal to the diameter of the bore in the gasket K, which it snugly fits, as shown clearly in the drawings, while there is sufficient space between the extension-strips N' to allow the ready passage of air from the chamber of the head through the valve-opening when the valve is unseated. A by-pass G is formed in said valve E', through which a small quantity of air may escape, so that there may be a sufficient reduction in the train-line to make a service application, if desired, in order that a rear portion of a train may be stopped.

By the provision of a valve having an extension-ring N, as shown and described, my invention will be capable of use in connection with various types of couplers which have the standard gaskets mounted in the apertured wall of the head by the outer face of said ring coming in contact with the outer edge of the gasket of another coupler, and when the two coupler-heads of different makes are locked together a tight joint is effected.

When uncoupling or coupling my invention, it will be observed that the two extension-rings will be in contact with each other, and a sufficient pressure will be applied to the same to hold the valves unseated when the coupler-heads are tilted slightly, as will be the case in the coupling or uncoupling of the two heads, thus allowing a free unrestricted passage of air through the valve-opening, and any trouble of the valves seating after the heads are disconnected would be entirely dispensed with.

By the provision of a by-pass, one in each valve, air may be gradually let out of the coupler-heads, thus causing the brakes to be gradually applied sufficient to stop the train. In the forward section of the train this by-pass will allow the air to escape; but the pump in the engine will force a sufficient quantity of air through the pipes to overcome that which escapes through the by-pass, so that there will be no service application upon the front section of the train.

While I have shown a particular construction of apparatus embodying the features of my invention, it will be understood that I may make alterations in the detailed construction of the same without departing from the spirit of the invention.

Having thus described my invention, what I claim as new, and desire to secure by Letters Patent, is—

A fluid-pressure coupler comprising a head, a threaded chambered plug having a circumferential flange and adapted to fit in a threaded aperture in the wall of said head, one face of said head being flat and having an aperture leading into the chambered portion of the head, the wall of said aperture having an annular recess, the outer wall of said recess being narrower than the inner wall, a gasket having a flanged portion seated upon the inner wall of said annular recess and provided with an angled portion which is adapted to engage the annular outline of the narrow wall of said recess, a valve having an integral stem mounted in the chambered portion of said plug, a spring seated in said plug and bearing against said valve, projections from the outer face of said valve along the marginal edge of the tapering portion thereof, said projections having shoulders on their outer faces, a ring seated upon said shoulders and flush with the tops of the projections, as shown and described.

In testimony whereof I hereunto affix my signature in presence of two witnesses.

DAVID H. STAPLES.

Witnesses:
A. L. HOUGH,
FRANKLIN H. HOUGH.